(12) United States Patent
Joung et al.

(10) Patent No.: US 6,754,222 B1
(45) Date of Patent: Jun. 22, 2004

(54) PACKET SWITCHING APPARATUS AND METHOD IN DATA NETWORK

(75) Inventors: Jinoo Joung, Kunpo-shi (KR); Kyung-Il Woo, Seoul (KR); Ki-Jong Doh, Kwachon-shi (KR)

(73) Assignee: Samsung Electronic Co., Ltd., Kyungki-Do (KR)

( * ) Notice: Subject to any disclaimer, the term of this patent is extended or adjusted under 35 U.S.C. 154(b) by 860 days.

(21) Appl. No.: 09/592,065

(22) Filed: Jun. 12, 2000

(30) Foreign Application Priority Data

Jun. 12, 1999 (KR) ........................................ 1999-21940
Dec. 22, 1999 (KR) ........................................ 1999-60235

(51) Int. Cl.[7] .............................................. H04L 12/28
(52) U.S. Cl. ...................................... 370/412; 370/415
(58) Field of Search .............................. 370/389, 412, 370/415

(56) References Cited

U.S. PATENT DOCUMENTS 5,408,464 A   4/1995  Jurkevich .................... 370/16
6,188,686 B1 * 2/2001 Smith ........................ 370/388
6,356,546 B1 * 3/2002 Beshai ....................... 370/358
2001/0007562 A1 * 7/2001 Matsuoka et al. ........... 370/412

FOREIGN PATENT DOCUMENTS

WO        WO 97/50214      12/1997

* cited by examiner

Primary Examiner—Salvatore Cangialosi

(57) ABSTRACT

Disclosed is a packet switching apparatus in a data network including a plurality of ports for taking charge of an input/output of packet transmission/reception commands and data packets, a plurality of transmission/reception control sections for accessing information resources classified into groups in response to the packet transmission/reception commands, and storing the corresponding data packets in a packet memory or transmitting the corresponding data packets stored in the packet memory to the corresponding ports, a plurality of the information resources for storing in groups information required for packet switching, and providing the information stored therein to the transmission/reception control sections, and a plurality of information resource schedulers, connected to the respective information resources, for scheduling accesses of the transmission/reception control sections.

20 Claims, 13 Drawing Sheets

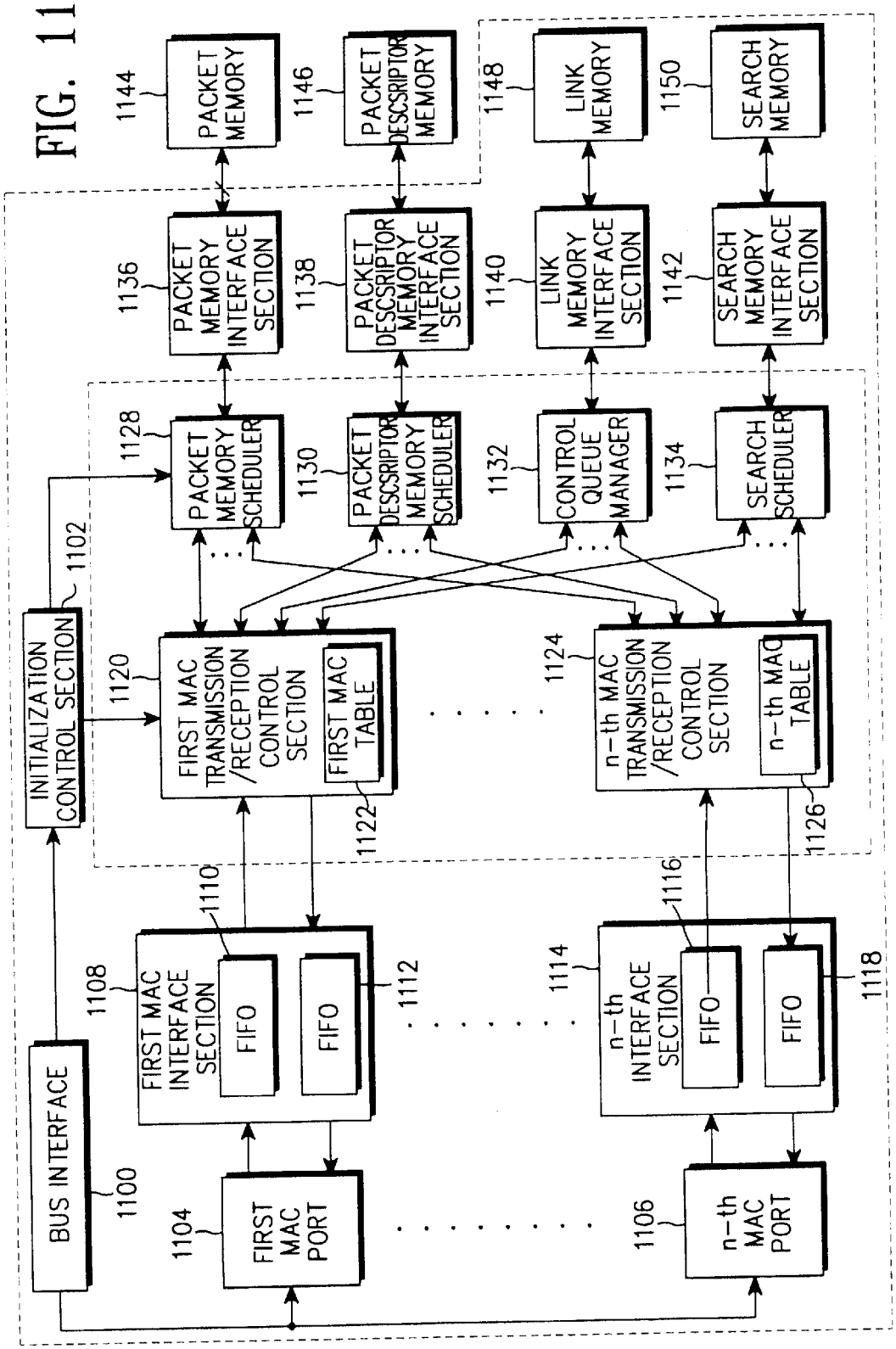

PACKET SWITCHING APPARATUS AND METHOD IN DATA NETWORK

CLAIM OF PRIORITY

This application makes reference to and claims all benefits accruing under 35 U.S.C. Section 119 from applications for PACKET SWITCHING APPARATUS AND METHOD IN DATA NETWORK filed earlier in the Korean Industrial Property Office on Jun. 12, 1999 and Dec. 22, 1999 and there duly assigned Serial No. 21940/1999 and 60235/1999, respectively.

BACKGROUND OF THE INVENTION

1. Field of the Invention

The present invention relates to a packet switching system in a data network. More particularly, the present invention relates to an apparatus and method of switching packets in parallel.

2. Description of the Related Art

In all different types of networks, excluding a point-to-point network, there exists a device for data collection and distribution. A switch and a router are two of the best examples of such data collection and distribution devices. In general, a data collection and distribution device has at least two ports. The device receives data through at least one of the ports, performs the necessary data processing, and then outputs the processed data through one or more ports.

During the data collection, processing and distributing processes, congestion within the device occurs. This congestion causes latency in data transmission. The most important reason among other various reasons for such congestion is the time required for processing the data.

A conventional data packet processing method for a packet switching system operates according to the following steps:

Step 1: a certain port receives a data packet;

Step 2: a first-in first-out (FIFO) section temporarily stores the input data packet;

Step 3: the input data packet waits to be processed while the previously inputted data packets are processed;

Step 4: a data packet processing section performs the necessary process with respect to the input data packet stored in the FIFO;

After step 4, the data processing requires a complicated decision process and this decision requires the transfer of information between decision-making modules, i.e., a controller and an information resource.

Step 5: after the completion of the packet processing, the data packet processing section checks whether other packets previously processed exist on the corresponding output port;

Step 6: if any other previously processed packet exists, the data packet processing section stores the processed packet in a buffer; and, Step 7: if the previously processed packets are all outputted, the data packet processing section transmits the processed packet stored in the buffer to the output port.

According to the conventional data packet processing method, since a single data packet processing section controls a plurality of ports and processes only one packet at a time, it can be easily implemented with a simple construction.

However, in the event that the number of input packets becomes greater with no change in the data processing time (actually, most packet switches and routers have this characteristic), the data line becomes an idle state. That is, data is not transmitted through the data line due to the delay problem in the data packet processing section. If the delay is particularly severe, data loss may occur which affects the integrity of the information.

Meanwhile, there are two elements, which should be considered in the packet processing. These elements are: (1) a control section for controlling and judging the whole processing procedure; and, (2) an information resource for storing and providing information required for the judgment of the control section. In most cases, the information resource is embodied in the form of a register and a memory. The reason that the conventional packet data processing method processes only one packet at a time in the packet switching system is because the information resource is provided using a single memory.

Accordingly, in order to solve the problems involved in the related art and to provide a rapid packet processing, the information that needs to be stored in the resource should be classified into sections or groups, so that the respective information groups are stored in different resources. Also, a plurality of transmission/reception control sections (more than the number of resources for the respective groups) should be allocated to reduce the processing overhead with respect to the input data packets.

Moreover, the transmission/reception control sections may be allocated for the respective ports. These transmission/reception control sections can reduce the control overhead and rapidly process the packets by simultaneously accessing the information resources for the respective groups.

Meanwhile, the transmission/reception control sections should be able to share the information resources. Accordingly, an arbiter or a scheduler should make the respective transmission/reception control section access one resource at a time. In case that the transmission/reception control sections access a specified information resource excessively, the access load should be maintained and balanced by readjusting the groups again.

FIG. 1 shows the construction of one embodiment known in the conventional packet switching apparatus. Referring to FIG. 1, a host 100 controls the whole operation of the packet switching apparatus. The host 100 takes charge of the uppermost layer and transmits commands that are inputted to the packet switching apparatus. A first MAC port 110 to the n-th MAC port 1n0 can be connected to another packet switching apparatus, router, or PC and perform a standard Medium Access Control (MAC) to output data packet transmission/reception commands to a transmission/reception control section 120. A data switching section 130 determines the paths of data and control signals to the host 100, the first MAC port 110 to the n-th MAC port 1n0, and a packet memory 150 under the control of the transmission/reception control section 120. The data switching section 130 may be implemented by a multiplexer/demultiplexer.

A search memory 140 stores information for determining an output MAC port corresponding to a destination address of the received packet, thus enables a registered MAC address to be detected. A packet memory 150 is provided with a plurality of information resources, such as an address table 152, a port table 154, and a packet descriptor 156. The packet memory 150 stores the input data packets. The address table 152 stores information on the MAC address, and the port table 154 stores status information, enable information, and information upon completion of the receiving operation. The packet descriptor 156 stores information about the respective packets (for example, packet connection information) stored in the packet memory 150.

The transmission/reception control section 120 controls the transmission/reception of packets inputted/outputted through the first MAC port 110 to the n-th MAC port 1n0 in accordance with the packet transmission/reception command. Specifically, the transmission/reception control section 120 temporarily stores the received data packet, checks whether the destination address of a header of the received packet is a registered address by accessing the search memory 140, and finds out in what position of the address table 152 the registered MAC address information is stored. Then, the transmission/reception control section 120 determines the MAC port to which the received packet is outputted.

During the packet reception, the transmission/reception control section 120 stores the received data packet in the packet memory 150 by accessing the address table 152, port table 154, and packet descriptor 156.

During the packet transmission, the transmission/reception control section 120 transmits the data packet stored in the packet memory 150 through the corresponding output port by accessing the address table 152, port table 154, and packet descriptor 156.

FIG. 2 shows the construction of another embodiment of the conventional packet switching apparatus. Referring to FIG. 2, a bus interface 212 receives a data packet from a host bus 210 and outputs the data packet to a first MAC port 211 to the n-th MAC port 21n. Similarly, the bus interface 212 outputs the data packet transmitted from the MAC ports to the host bus 210.

The first MAC port 211 to n-th MAC port 21n perform the standard MAC-control and outputs a data packet transmission/reception command to the transmission/reception control section 120. A MAC port interface 238 serves as an interface between the respective MAC ports and the transmission/reception control section 228. The MAC port interface 238 is provided with a transmission/reception FIFO for each MAC port and temporarily stores the sub packets.

A multiplexer 224 selects the corresponding data packet among the data packets for the respective ports outputted from the MAC port interface 238 and outputs the corresponding data packet to the transmission/reception control section 228. A demultiplexer 226 demultiplexes the data packet outputted from the transmission/reception control section 228 and outputs the demultiplexed data packets to the corresponding ports.

A search memory 236 stores information for determining an output MAC port corresponding to a destination address of the received packet. A packet memory 234 is provided with a plurality of information resources, such as an address table, port table, and packet descriptor. The packet memory 234 stores the input data packets.

The transmission/reception control section 228 controls the transmission/reception of the packets inputted/outputted through the first MAC port 210 to the n-th MAC port 21n in accordance with the packet transmission/reception command. Specifically, the transmission/reception control section 228 temporarily stores the received data packet, checks whether the destination address of a header of the received packet is a registered address by accessing the search memory 236, and finds out in what position of the address table (not illustrated) in the packet memory 234 the registered MAC address information is stored. Then, the transmission/reception control section 238 determines the MAC port to which the received packet is outputted.

During the packet reception, the transmission/reception control section 228 stores the received data packet in the packet memory 234 by accessing the address table, port table, and packet descriptor (not illustrated) provided in the packet memory 234.

During the packet transmission, the transmission/reception control section 228 transmits the data packet stored in the packet memory 234 through the corresponding output port by accessing the address table, port table, and packet descriptor.

According to the conventional packet switching apparatus shown in FIGS. 1 and 2, since a single transmission/reception control section receives the data packet transmission/reception commands from a plurality of ports and various different types of information resources—for example, the address table, port table, etc., are stored in a single packet memory—it is necessary that only one packet be processed at a time.

Therefore, the packet delay occurs during the data packet processing, thereby causing the data line to become idle state. For instance, if the transmission/reception control section is performing a command form in a certain port, a packet from another port must wait until the performance of the command is completed.

FIG. 3 illustrates a status flowchart showing the reception control flow of the conventional packet switching system. Referring to FIGS. 1 and 3, "Rx Control" refers to a series of operations performed based on the information obtained after the search operation of the transmission/reception control section 120.

Specifically, FIG. 3 illustrates a series of control operations that the transmission/reception control section 120 undergoes when receiving the data packets from the first MAC port 110 to the n-th MAC port 1n0 and when storing the received data packets in the packet memory 150. FIG. 3 is the simplest state diagram, except for the case of processing various errors, address mismatch, filtering, etc. At each state shown in FIG. 3, the time required for processing the packet of 64 bytes is indicated in the event that the transmission/reception control section 120 operates at a frequency of 50 MHz. As illustrated in FIG. 3, it can be known that a plurality of control states exist from an idle state 300 to a packet transmission (Xfer_pkt) state 332.

Table 1 below represents the operations performed in the respective states shown in FIG. 3 during the reception control operation by the conventional packet switching device. Table 1 also represents the packet memory 150, address table 152, and port table 154 the transmission/reception control section 120 as they access through the data switching section 130 in the respective states. The table also indicates the data processing time in the respective states when the transmission/reception control section operates at the frequency of 50 MHz in the event of receiving the packet of 64 bytes.

TABLE 1

| State | Operation | Resource | Time |
|---|---|---|---|
| get Rx information | Read receive port table information | Port Table | 420 ns |
| src lookup | Read address table(source addr) | Addr Table | 300 ns |
| dst lookup | Read address table(destination addr) | Addr Table | 320 ns |

TABLE 1-continued

| State | Operation | Resource | Time |
|---|---|---|---|
| get pkt count | Read ATM port table packet counts may be skipped in Ethernet operation | Port Table | 40 ns |
| deQ EB | Dequeue an empty buffer | Port Table | 220 ns |
| init desc | Initialize packet descriptor | Packet mem | 200 ns |
| get cur addr | Determine addr at which to write data | Port Table | 20 ns |
| get pkt length | Read various information from packet desc | Packet mem | 60 ns |
| update src AT | Update statistics in source address table | Addr Table | 80 ns |
| update dst AT | Update statistics in destination address table | Addr Table | 120 ns |
| Xfer pkt | Transfer packet(subpacket) | Packet mem | 460 ns |
| DeQ Rx | Dequeue Rx Queue | Port Table | 40 ns |
| EnQ Tx | Enqueue Tx Queue | Port Table | 80 ns |

As shown in Table 1, it is known in the art that according to the conventional packet switching method, the transmission/reception control section 120 requires a significant amount of time for sending/receiving information by accessing the port table 154 and the address table 152, in addition to the time required for actually storing the data packets in the packet memory 150.

Additionally, during a receiving cycle, the respective time required by the respective state for accessing the port table 154, address table 152, and packet memory 150 is summarized as follows:

In the event that the conventional packet switching apparatus of FIG. 1 is actually implemented to operate at a frequency of 50 MHz and receives data packets of 64 bytes, the time required for accessing the port table 154 is 820 nS. In total, the time required for accessing the packet memory 150 is 720 nS and the time required for accessing the address table 152 is 820 nS.

For instance, if transmission/reception control sections 120 are independently arranged for the first MAC port 110 to n-th MAC port 1n0, respectively, and the port tables for the respective MAC ports are distributed among the respective transmission/reception control sections 120, the port table access time will be greatly reduced.

In practice, the time required for the whole receive control cycle will be reduced to about 820 nS (on the basis of the access time of the address table 152).

Moreover, if the address table 152 is separated from the packet memory 150 and the respective transmission/reception control sections simultaneously access the address table 152 and/or the packet memory 150, the transmission/reception control sections of the different ports will be able to access the address table 152 and the packet memory 150 simultaneously. Accordingly, the delay of packet transmission can be reduced, and an effective data transmission can be achieved.

If the address table 152 and the transmission/reception control sections for the respective ports are built in the same chip, and the access of the address table 152 is of 32 bits or more, the time required for accessing the address table 152 will be below 820 nS. Accordingly, in the whole receive control cycle, the bottleneck will be the time (720 nS) required for accessing the packet memory. In other words, the time required for the receive control cycle will be reduced below 720 nS.

Table 2 below shows operations performed in the respective states in case that the conventional packet switching apparatus of FIG. 1 performs the transmission control.

TABLE 2

| Idle | Read Port Table | Read pkt desc | Pkt Xfer | Update pkt desc | Idle |
|---|---|---|---|---|---|
| | Port Table 220 ns | Packet desk 300 ns | Packet mem 540 ns | Pkt desc 160 ns | |

In Table 2, the following operation can be performed in a read port table state. The transmission/reception control section 120 reads the current transmission address pointer by accessing the port table 154. If the packet to be transmitted is a start of packet (SOP), the transmission/reception control section 120 initializes the transmission byte of the port table 154 and reads a packet data pointer by accessing the packet descriptor 156. If the packet to be transmitted corresponds to a multi-cast, it reads a multi-cast data pointer.

Also, in Table 2, the following operation can be performed in the packet transmission (Xfer_pkt) state. The transmission/reception control section 120 reads the sub packet to be transmitted by accessing the packet memory 150. If the packet to be transmitted is a start of packet (SOP), the transmission/reception control section 120 dequeues a transmission buffer provided in the packet memory 150 and enqueues an empty buffer. Then, the transmission/reception control section 120 decreases the current packet count. If the current packet count is "0", the transmission/reception control section 120 disables the corresponding port queue.

Meanwhile, in case that the packet switching apparatus of FIG. 1 performs the transmission control operation, the control overhead is not so big in comparison to the actual transmission operation of the data packet.

However, if the control operation and the transmission operation are separated from each other in the same manner as in the receive control operation, the time required for processing the data packet can be reduced. For instance, if the packet descriptor 156 is provided in a transmission block of the respective port transmission/reception control section, the time required for the whole transmission cycle can be reduced.

FIG. 4 is a timing diagram illustrating the case that packets are sent and received between the MAC interface and the transmission/reception control section of the conventional packet switching apparatus of FIG. 2. In FIG. 2, the size of the respective packets being transmitted/received is 64 bytes, and thus one packet becomes the SOP as well as the EOP. Also, the operating frequency is 50 MHz, and the clock frequency is 1/20 nS.

The transmission/reception section 228 processes the packets from a specified MAC port previously searched in the data receive state 424. In a search and transmission state 426, a search operation with respect to the packet to be processed next—for instance, outputted from another MAC port—not the above MAC port, and an operation of transmitting the packet to be presently transmitted to the corresponding MAC port are performed. If the search and transmitting state 426 is completed, the transmission/reception control section 228 enters into the transmitting state 428 and performs the packet transmission. Then, one cycle of the packet processing terminates after the transmitting state 428 is completed. At this time, the period of the data receive state 424 is 2480 nS, and the added period of the search and transmitting state and the transmitting state is 1520 nS.

In FIG. 4, the receive (Rx) control overhead is given by:

$$(1-320/2480)=87\%  \quad \text{[Equation 1]}$$

Here, "2480" represents the period of the data receive state 424 and "320" represents the time required for storing the actual receive data packet from the corresponding MAC port in the packet memory 150 by the transmission/reception control section 228.

Also, in FIG. 4, the transmission (Tx) control overhead is given by:

$$(1-320/1520)=79\%  \quad\quad\quad [\text{Equation 2}]$$

Here, "1520" represents the added period of the search and transmitting state 426 and the transmitting state 428 and "320" represents the time required for transmitting the actual transmission data packet from the packet memory 234 to the corresponding MAC port by the transmission/reception control section 228.

Also, in FIG. 4, the total control overhead is given by:

$$(1-640/4000)=84\% \quad\quad\quad [\text{Equation 3}]$$

Here, "4000" represents the time for one cycle of the packet processing and "640" means the time required for transmitting the actual data packet by accessing the packet memory 234 by the transmission/reception control section 228.

From Equation 3, it can be known that if the packet size of the conventional packet switching apparatus of FIG. 2 is 64 bytes, the control overhead is 84%. Specifically, 84% of the time required for inputting, processing, and then outputting one data packet is used for the control operation and the remaining 16% is used for the actual data transmission.

SUMMARY OF THE INVENTION

Accordingly, the present invention has been made in an effort to solve the problems occurring in the related art, and one object of the present invention is to provide an apparatus for performing a high-speed packet switching by reducing a control overhead in a data network.

It is another object of the present invention to provide an apparatus which can rapidly process packets with a control overhead reduced in a data network by classifying an information resource into groups, storing the groups in a plurality of different resources, and independently accessing the information resources by a plurality of transmission/reception control sections, respectively.

It is still another object of the present invention to provide an apparatus which can rapidly process packets with a control overhead reduced in a data network by classifying an information resource into groups, storing the groups in a plurality of different resources, and independently accessing the information resources by a plurality of port transmission/reception control sections, respectively.

It is still another object of the present invention to provide an apparatus and method which can perform a high-speed packet switching in a data network by classifying information resources required for packet switching such as a packet descriptor, port table, link memory, address table, etc., into groups, and accessing in parallel the information resources by scheduling operations of a plurality of transmission/reception control sections.

In order to achieve the above objects, according to the present invention, there is provided a packet switching apparatus in a data network comprising: a plurality of ports for taking charge of an input/output of packet transmission/reception commands and data packets: a plurality of transmission/reception control sections for accessing information resources classified into groups in response to the packet transmission/reception commands and for storing the corresponding data packets in a packet memory or transmitting the corresponding data packets stored in the packet memory to the corresponding ports; a plurality of the information resources for storing in groups information required for packet switching and for providing the information stored therein to the transmission/reception control sections; and, a plurality of information resource schedulers, connected to the respective information resources, for scheduling accesses of the transmission/reception control sections.

In another aspect of the present invention, there is provided a packet switching method in a data network, comprising a first step of a plurality of transmission/reception control sections outputting corresponding access signals to schedulers of information resources classified into groups to access the respective information resources, a second step of the schedulers of the respective information resources performing a scheduling with respect to the access signals so that the plurality of transmission/reception control sections can access one of the information resources at a time, and a third step of the plurality of transmission/reception control sections storing the received data packets or transmitting the stored data packets with reference to the corresponding information resources if access paths are connected.

BRIEF DESCRIPTION OF THE DRAWINGS

The above objects and advantages of the present invention will become more apparent by describing in detail preferred embodiments thereof with reference to the attached drawings in which:

FIG. 11 is a block diagram of the packet switching apparatus in a data network according to a fifth embodiment of the present invention.

DETAILED DESCRIPTION OF THE PREFERRED EMBODIMENTS

Reference will now be made in greater detail to the preferred embodiments of the present invention. For the purpose of clarity, a detailed description of known functions and configurations incorporated herein will be omitted as they may make the subject matter of the present invention unclear. Hereinafter, the present invention will now be explained with reference to the accompanying drawings.

First Embodiment

Figure 1:
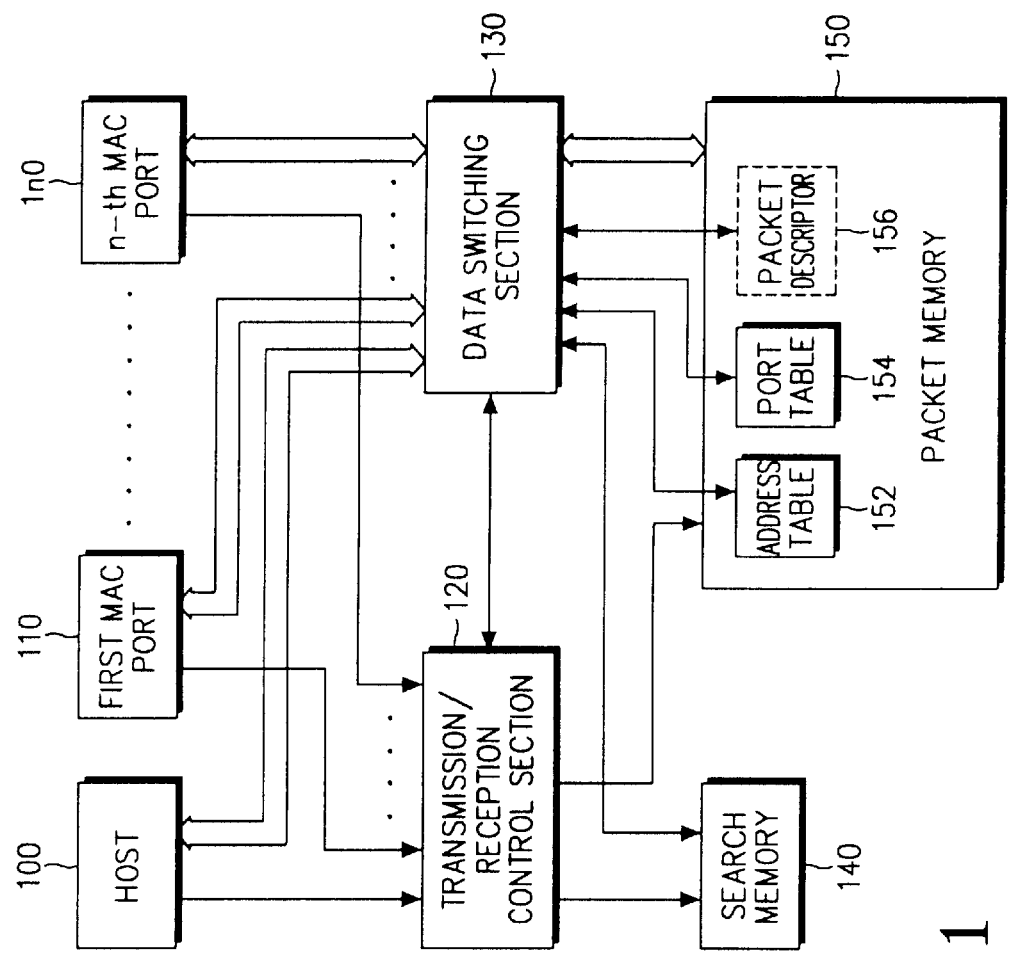
FIG. 1 is a block diagram of the embodiment of a conventional packet switching apparatus.
Figure 2:
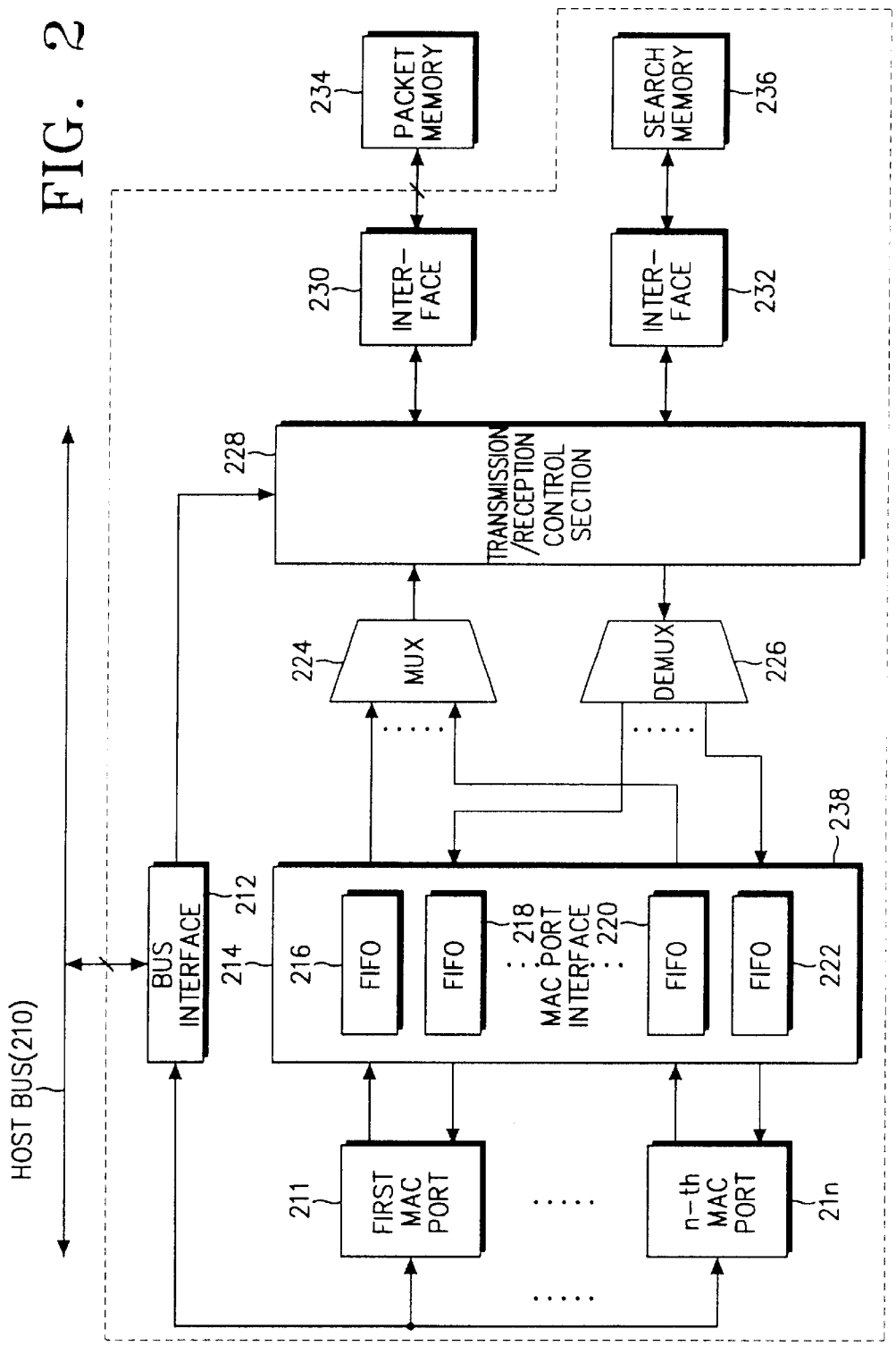
FIG. 2 is a block diagram of another embodiment of a conventional packet switching apparatus.
Figure 3:
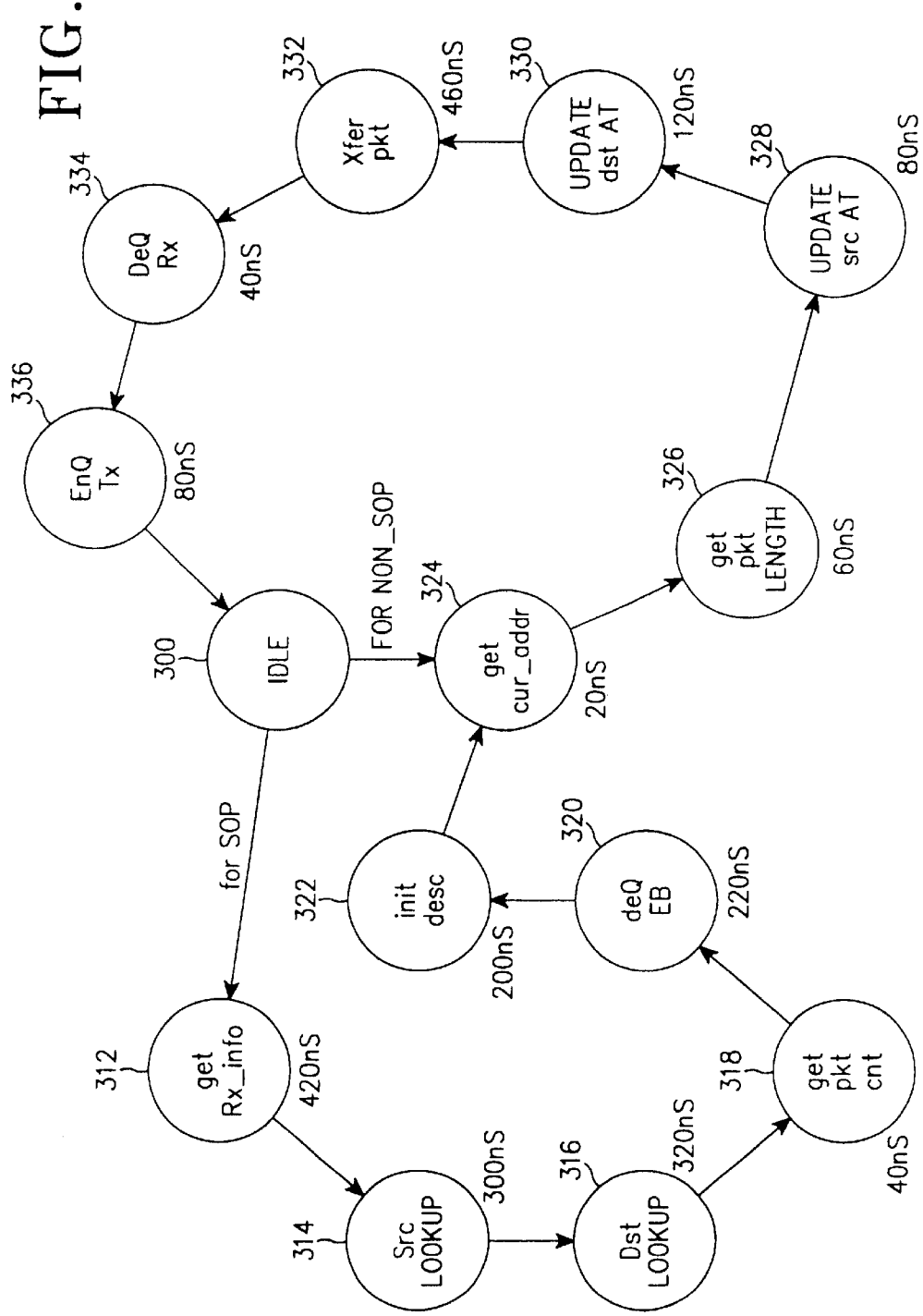
FIG. 3 is a flowchart illustrating the Receive Control State in a conventional packet switching apparatus.
Figure 4:
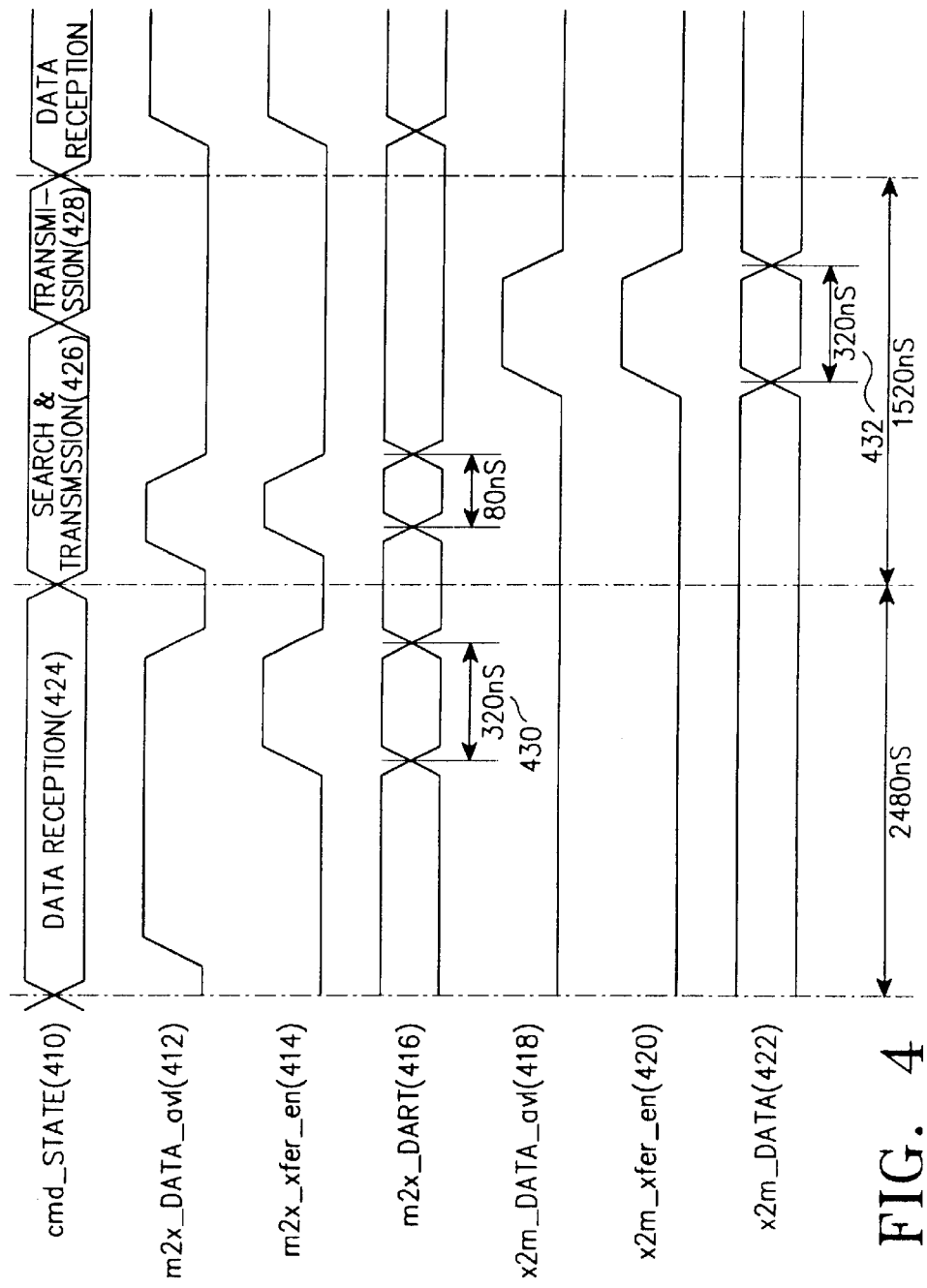
FIG. 4 is a timing diagram illustrating the case that the packets are sent and received between a MAC interface and a transmission/reception control section in the conventional packet switching apparatus of FIG. 2.
Figure 5:
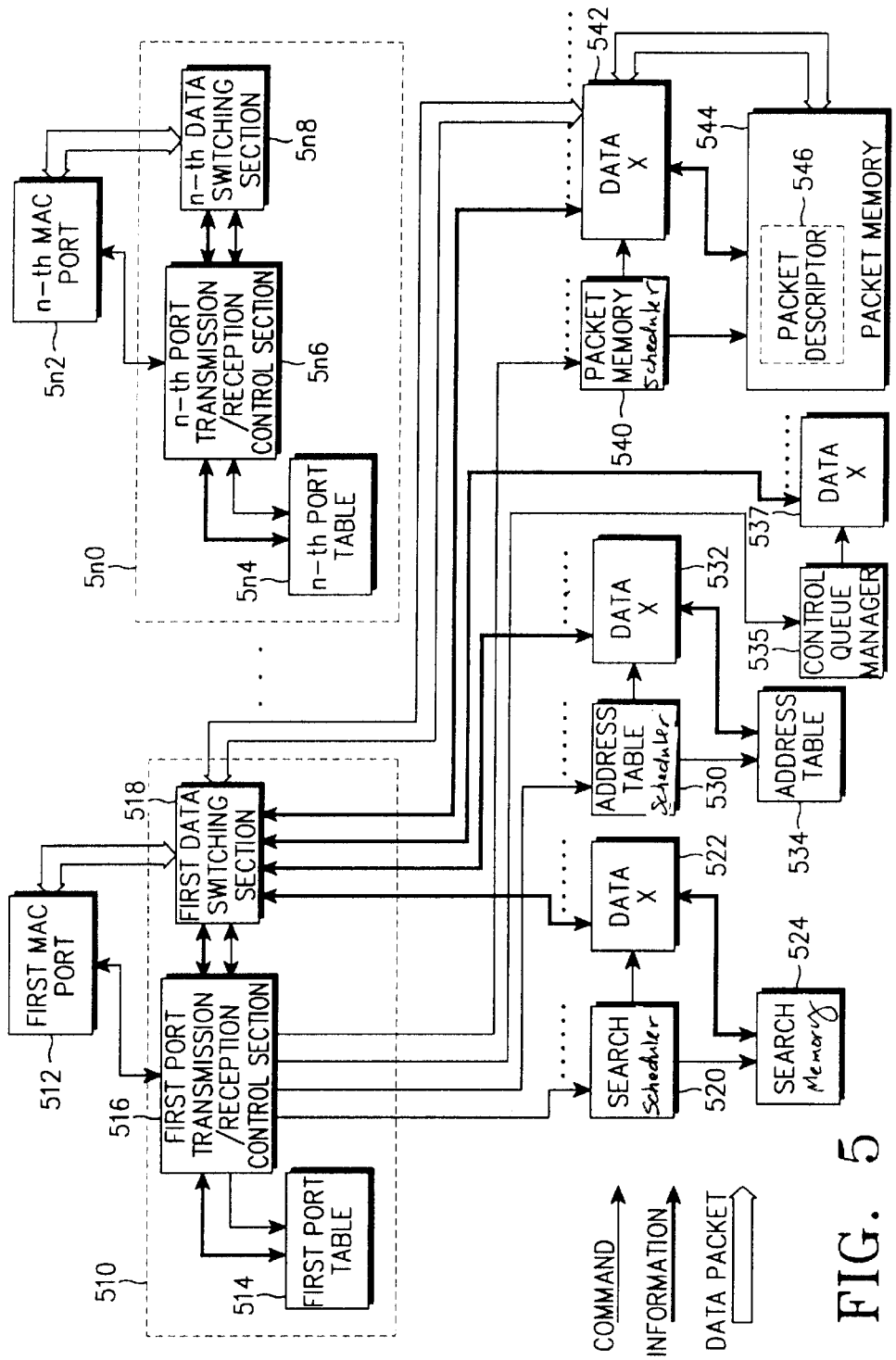
FIG. 5 is a block diagram of a packet switching apparatus in a data network according to a first embodiment of the present invention.

FIG. 5 shows the packet switching apparatus in a data network according to the first embodiment of the present invention.

A first MAC port 512 to the n-th MAC port 5n2 may be connected to different packet switching apparatuses, routers, or PCs, respectively. The first MAC port 512 to the n-th MAC port 5n2 perform the standard MAC control and output the corresponding packet transmission/reception commands to a first port transmission/reception control section 516 to the n-th port transmission/reception control section 5n6 connected thereto, respectively.

The MAC ports transmit the received data packets to the transmission/reception control sections which are respectively connected thereto and output the data packets from the corresponding transmission/reception control sections to the corresponding protocol control sections. The protocol control sections may be provided in other packet switching apparatuses, routers, or PCs.

The first port transmission/reception control section 516 to the n-th port transmission/reception control section 5n6 perform the packet transmission/reception control in accordance with the packet transmission/reception commands outputted from the corresponding MAC ports.

A first data switching section 518 to the n-th data switching section 5n8 provide paths for the data packets and the control signals under the control of the corresponding port transmission/reception control sections. A first port table 514 to the n-th port table 5n4 store port information on the corresponding MAC ports and are arranged in distribution in the respective ports. The information on the respective MAC ports is independent ones which do not require participation by other ports. In FIG. 5, the first port table 514 to the n-th port table 5n4 are connected to the corresponding port transmission/reception control sections.

The information resources, which should be considered when the first port transmission/reception control section 516 to the n-th port transmission/reception control section 5n6 perform the transmission/reception control of the packets with respect to the corresponding ports, are separated into groups.

According to the embodiment of FIG. 5, the groups are the first port table 514 to n-th port table 5n4 and the search memory 524, the address table 534, the control queue manager 535, and the packet memory 544. The first port transmission/reception control section 516 to the n-th port transmission/reception control section 5n6 store the received packets in the packet memory 150, or transmit the data packets stored in the packet memory 150 through the corresponding output ports by independently accessing the search memory 524, the address table 534, the control queue manager 535, and the packet memory 544. That is, in order to perform the packet reception/transmission control, the respective port transmission/reception control sections access four schedulers, except for the respective port table among the separated information resources. The respective schedulers may use a Round-Robin system.

The search scheduler 520 enables the first port transmission/reception control section 516 to the n-th port transmission/reception control section 5n6 to share the search memory 524. That is, the search scheduler 520 enables only one port transmission/reception control section to access the search memory 524 at a certain point in time.

In the same manner as the search scheduler 520, an address table scheduler 530 and a packet memory scheduler 540 also enables the first port transmission/reception control section 516 to the n-th port transmission/reception control section 5n6 to share the address table 534 and the packet memory 544 in the similar manner.

Moreover, the control queue manager 535 enables the first port transmission/reception control section 516 to the n-th port transmission/reception control section 5n6 to share in the similar manner. The control queue manager 535 stores the pointer information of the respective queues for the queueing operation with respect to the packet memory 544 and updates the pointer information according to the queueing operation. The control queue manager 535 also outputs the pointer information to the selected corresponding port transmission/reception control section so that the port transmission/reception control section performs the queueing operation.

The construction of FIG. 5 can be fabricated into one chip except for the packet memory 544. The packet descriptor 546 can be separated from the packet memory 544 so that the respective port transmission/reception control sections share therebetween and the respective port transmission/reception control sections can perform the transmission/reception control by creating a plurality of tasks.

Now, the operation of the packet switching apparatus according to the embodiment of the present invention as constructed above will be explained. The respective port transmission/reception control sections temporarily store the received data packets. Also, the respective port transmission/reception control sections check whether the destination address of a header of the received packet is a registered address and find out at what position of the address table 534 the registered MAC address information is stored by accessing the search memory 524 through the search scheduler 520. Then, the respective port transmission/reception control sections determine the MAC port to which the received packet is outputted.

The respective port transmission/reception control sections check a source address and a destination address of the received packet by accessing the address table 534 through the address table scheduler 530. Thereafter, the respective port transmission/reception control sections check the port information by accessing the corresponding port tables 514-5n4 directly connected to thereto, and check the MAC address information and the packet information by accessing the address table 534 and the packet descriptor 546 through the address table scheduler 530 and the packet memory scheduler 540. Then the respective port transmission/reception control sections store the temporarily stored packets in the packet memory 546.

In the case of the packet transmission, the respective port transmission/reception control sections transmit the data packets stored in the packet memory 544 through the corresponding output ports by accessing the address table 534 and the packet descriptor 546 through the address table scheduler 530 and the packet memory scheduler 540, with reference to the corresponding port tables connected to themselves.

Thereafter, the respective port transmission/reception control sections perform an error checking operation. Specifically, if there were MAC error, unknown source address, address move, and destination address occur with respect to the packets, the respective port transmission/ reception control sections determine a drop, broadcast, or forward to host.

Meanwhile, an example of a process that the respective port transmission/reception control sections store the data packets in the packet memory 544 and output the data packet stored in the packet memory 544 to the corresponding MAC ports will be explained.

If the packets are received, the respective transmission/ reception control sections store the received packets as they access the corresponding port tables, dequeue the empty buffer, and enqueue the received queue with reference to the pointer information of the control queue manager 535.

Subsequently, the respective port transmission/reception control sections connect the packets stored in the packet memory using the pointer by accessing the corresponding port tables and performing the queueing operation with reference to the pointer information of the control queue manager 535.

The information of the packets is stored in the packet descriptor 546. Also, the respective port transmission/ reception control sections enqueue the received (Rx) queue with reference to the pointer information of the control queue manager 535, if the currently processed packet is the end of pocket (EOP) when the packet is received from the corresponding ports. If the currently processed packet is the EOP, the port transmission/reception control sections dequeue the received queue and enqueue the transmission (Tx) queue provided in the packet memory 544 with reference to the pointer information of the control queue manager 535.

In case of the packet transmission, the respective port transmission/reception control sections refer to the information of the packets by accessing the packet descriptor 546 and transmit the corresponding packet stored in the packet memory 544 to the MAC of the output port. At this time, the respective port transmission/reception control sections access the corresponding port tables, dequeue the transmission (Tx) queue, and enqueue the empty buffer with reference to the pointer information of the control queue manager 535.

Second Embodiment

Figure 6:
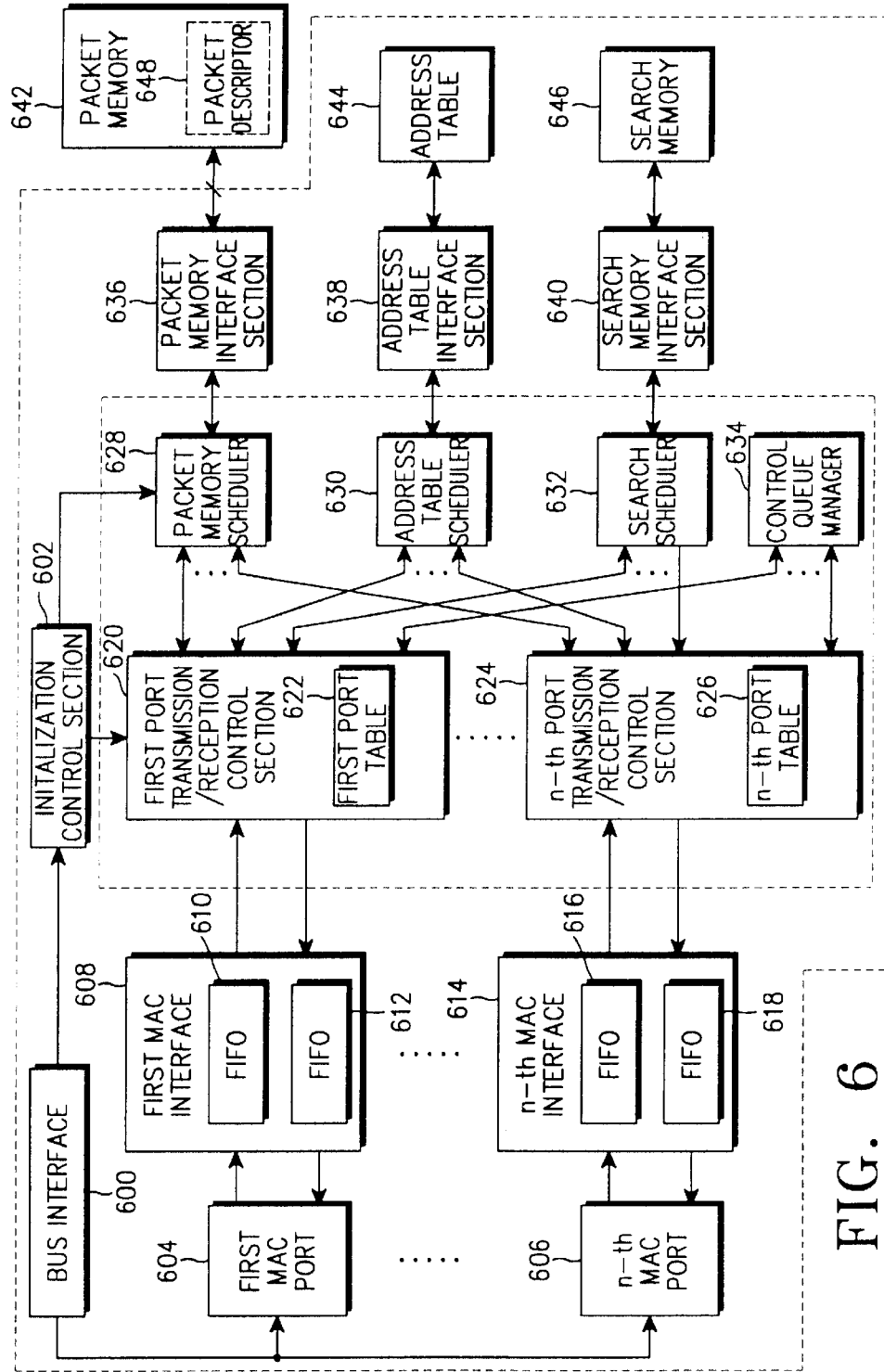
FIG. 6 is a block diagram of a packet switching apparatus in a data network according to a second embodiment of the present invention.

FIG. 6 shows the packet switching apparatus in a data network according to the second embodiment of the present invention.

The packet switching apparatus of FIG. 6 may be connected to a host (not shown) and a plurality of packet switching apparatuses (not shown) through a bus interface 600. Also, the packet switching apparatus of FIG. 6 may be connected to a router or a PC through the bus interface 600.

The first MAC port 604 to the n-th MAC port 606 perform the standard MAC control, and output the packet transmission/reception commands. These respective MAC ports take charge of the input/output of the data packets. Specifically, the MAC ports transmit the received data packets to the transmission/reception control sections connected thereto and output the data packets from the corresponding transmission/reception control sections to the corresponding protocol control sections. The respective MAC ports can perform a full-duplex operation or half-duplex operation. The respective MAC ports may be positioned outside the packet switching apparatus.

The first MAC interface section 608 to the n-th MAC interface section 614 function as interfaces between the MAC ports and the port transmission/reception control sections, respectively, and control the sub-packet transmission. The respective MAC interface sections are provided with transmission and reception FIFOs, and temporarily store the sub packets. The respective MAC interface sections output the packet transmission/reception commands to the corresponding port transmission/reception control sections when the transmission or reception control section is available.

The first port transmission/reception control section 620 to the n-th port transmission/reception control section 624 may be provided for each MAC port. The respective port transmission/reception control sections have a first port table 622 to the n-th port table 626. If the packet transmission/ reception command is inputted, the respective port transmission/reception control sections perform the address search operation by accessing the provided port tables.

Also, the respective port transmission/reception control sections output a connection request signal to the packet memory scheduler 628, address table scheduler 630, or search scheduler 632 to access the packet memory 642, address table 644 or search memory 646. If the connection to the desired information resources is completed, the respective port transmission/reception control sections perform the sub-packet transmission, SOP processing and EOP processing for the respective sub-packets, packet enqueueing, and packet dequeueing. Also, the respective port transmission/reception control sections update statistical information on the source/destination addresses.

The packet memory scheduler 628 is connected to the respective port transmission/reception control sections. The address table scheduler 630 connects the selected corresponding port transmission/reception control sections to the address table 644 by scheduling the connection request signals from the respective port transmission/reception control sections.

In this embodiment of the present invention, the packet memory scheduler 628 can control the empty queue, host queues of "0" and "1", and multicast queue provided in the control queue manager 634. Also, the packet memory scheduler 628 can control the enqueueing and dequeueing operation with respect to the queues of the control queue manager 634 such as the receive (Rx) queue, transmission (Tx) queue, etc.

The control queue manager 634 is connected to the respective port transmission/reception control sections and performs the enqueueing and dequeueing operation with respect to the queues such as the Rx queue, Tx queue, etc., by scheduling the connection request signals from the respective port transmission/reception control sections. The queue manager 634 has the empty queue, multicast queue, host queues of "0" and "1", and expansion queue. If the host (not illustrated) is connected to the bus interface 600, the expansion queue includes the host queues.

The address table scheduler 630 is connected to the respective port transmission/reception control sections. The address table scheduler 630 connects the selected corresponding port transmission/reception control section to the address table 644 by scheduling the connection request signals from the respective port transmission/reception control sections.

The search scheduler 632 is connected to the respective port transmission/reception control section. The search scheduler 632 connects the selected corresponding port transmission/reception control section to the search memory 646 by scheduling the connection request signals from the respective port transmission/reception control sections.

The packet memory interface 636 serves as an interface between the packet memory scheduler 628 and the packet memory 642. The address table interface 638 serves as an interface between the address table scheduler 630 and the address table 644. The search memory interface 640 serves as an interface between the search scheduler 632 and the search memory 646.

The first port table 622 to the n-th port table 626 store therein the state information, enable information, and information on the completion of the receiving operation of the respective MAC ports. The packet memory 642 stores therein the sub packets, and the packet descriptor 648 stores therein information on the respective sub-packets. The address table 644 stores therein the source MAC addresses of the destination MAC address of the registered packets. Plus, the search memory 646 stores information for judging the output MAC port corresponding to the destination address of the received packet.

According to FIG. 6, the operation of the packet switching apparatus of this embodiment of the present invention will now be explained. The receive control means the process of storing the sub packets stored in the MAC interface sections per port in the packet memory 642. The corresponding MAC interface section outputs the corresponding packet reception command if the received sub-packet is inputted to the FIFO. If the command is inputted, the port transmission/reception control section checks the header information of the received sub-packet to obtain the required information.

If the received sub-packet corresponds to the SOP, the port transmission/reception control section performs the search operation by accessing the search memory 646 through the search scheduler 632. At this time, in the embodiment of the present invention, the port transmission/reception control section can partially perform the packet transmission command if the input packet transmission command does not correspond to the search operation while the search operation is performed.

The port transmission/reception control section operates a state machine based on the information obtained from the search operation, address table 644, and the corresponding port table, and passes the required judgment accordingly. The received sub-packets are stored in the packet memory 646.

Meanwhile, the respective states output the respective required commands to the packet memory scheduler 628, address table scheduler 630, and queue manager 634, and if the corresponding commands are selected by the schedulers, they obtain the required information by accessing the packet descriptor 648 and the address table 644.

The port transmission/reception control section stores the sub packet stored in the corresponding MAC interface in the packet memory 642 by requesting the packet transmission (Xfer_pkt) command to the packet memory scheduler 628. If the received sub-packet corresponds to the EOP, i.e., if the storage of the packets is completed with respect to the whole frame (for instance, Ethernet frame), the port transmission/reception control section dequeues the receive (Rx) queue, and enqueues the transmission (Tx) queue with respect to the destination MAC port.

Meanwhile, if the reception of the sub packets with respect to the whole frame is completed, the corresponding transmission/reception control section performs the packet transmission control according to the command of the corresponding destination MAC port. At this time, the packet transmission is performed in the unit of a sub packet, and the information required during the transmission is obtained from the packet descriptor 648 and the corresponding port table.

Figure 7A:
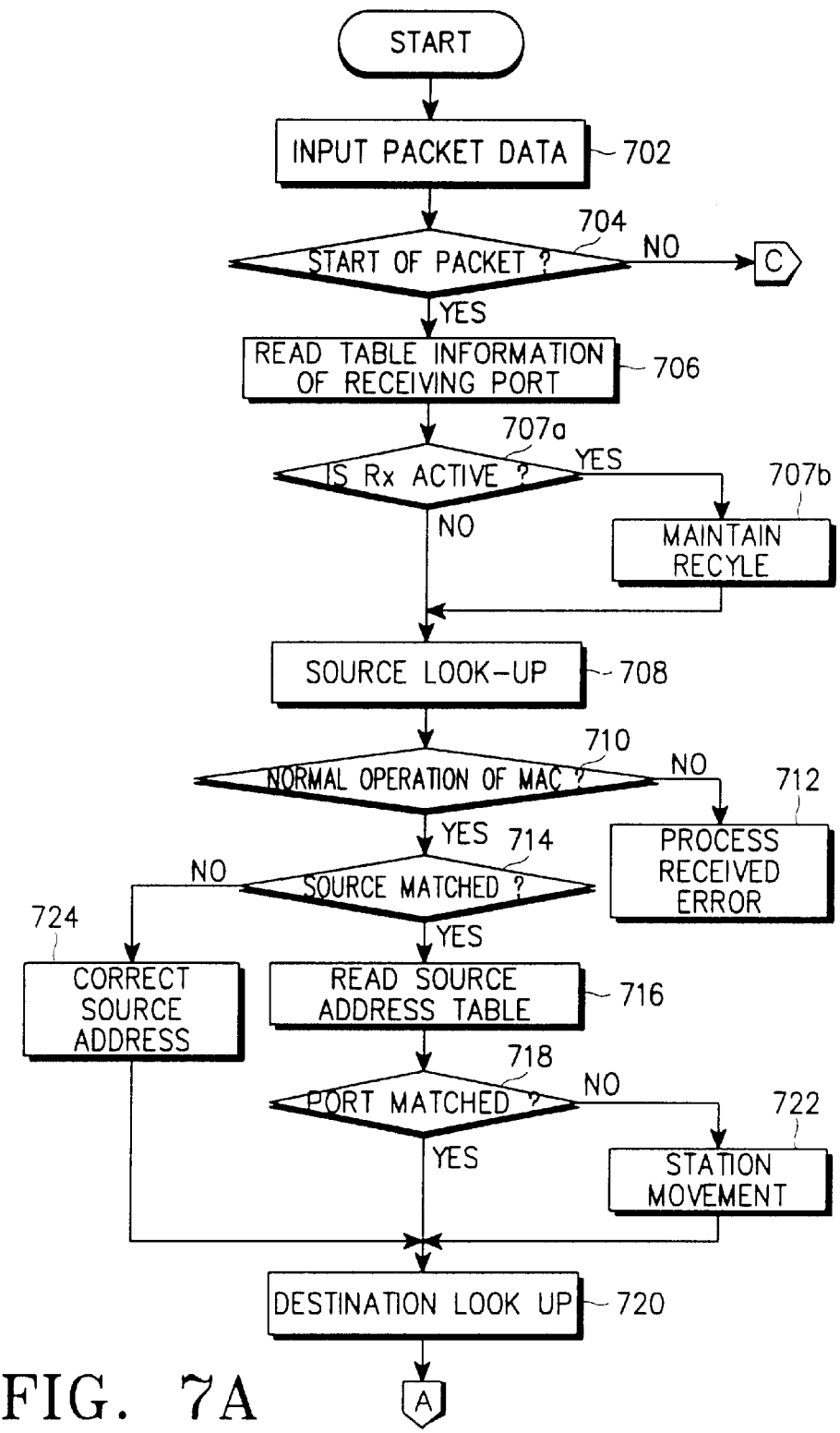
FIGS. 7A to 7C, are flowcharts illustrating the whole receive control operation of the packet switching apparatus according to the embodiment of the present invention.
Figure 7B:
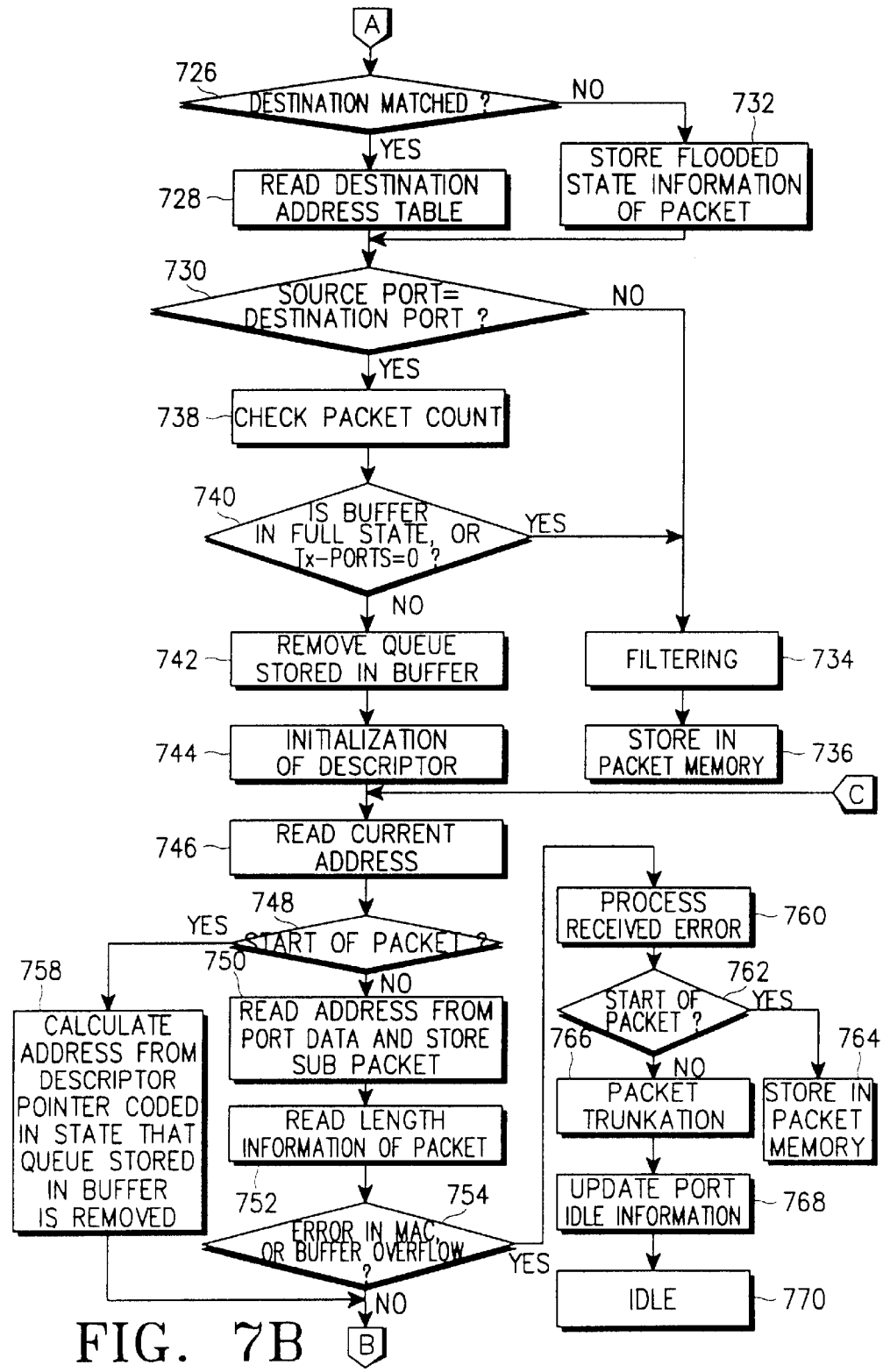
Figure 7C:
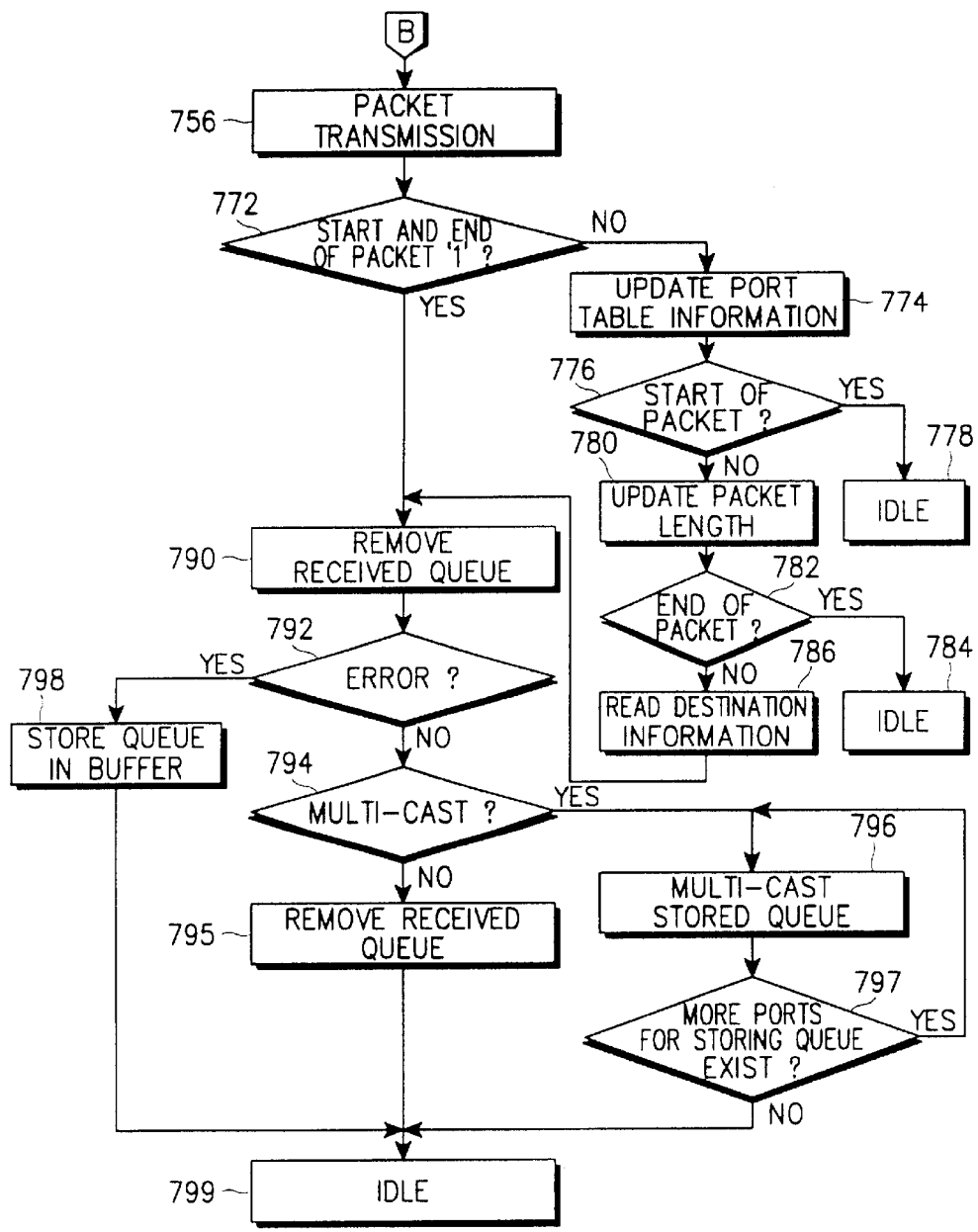

FIGS. 7A to 7C are flowcharts illustrating the whole receive control operation of the packet switching apparatus according to an embodiment of the present invention. The respective processes illustrated therein correspond to the general data packet processes in the packet switching system.

Figure 8:
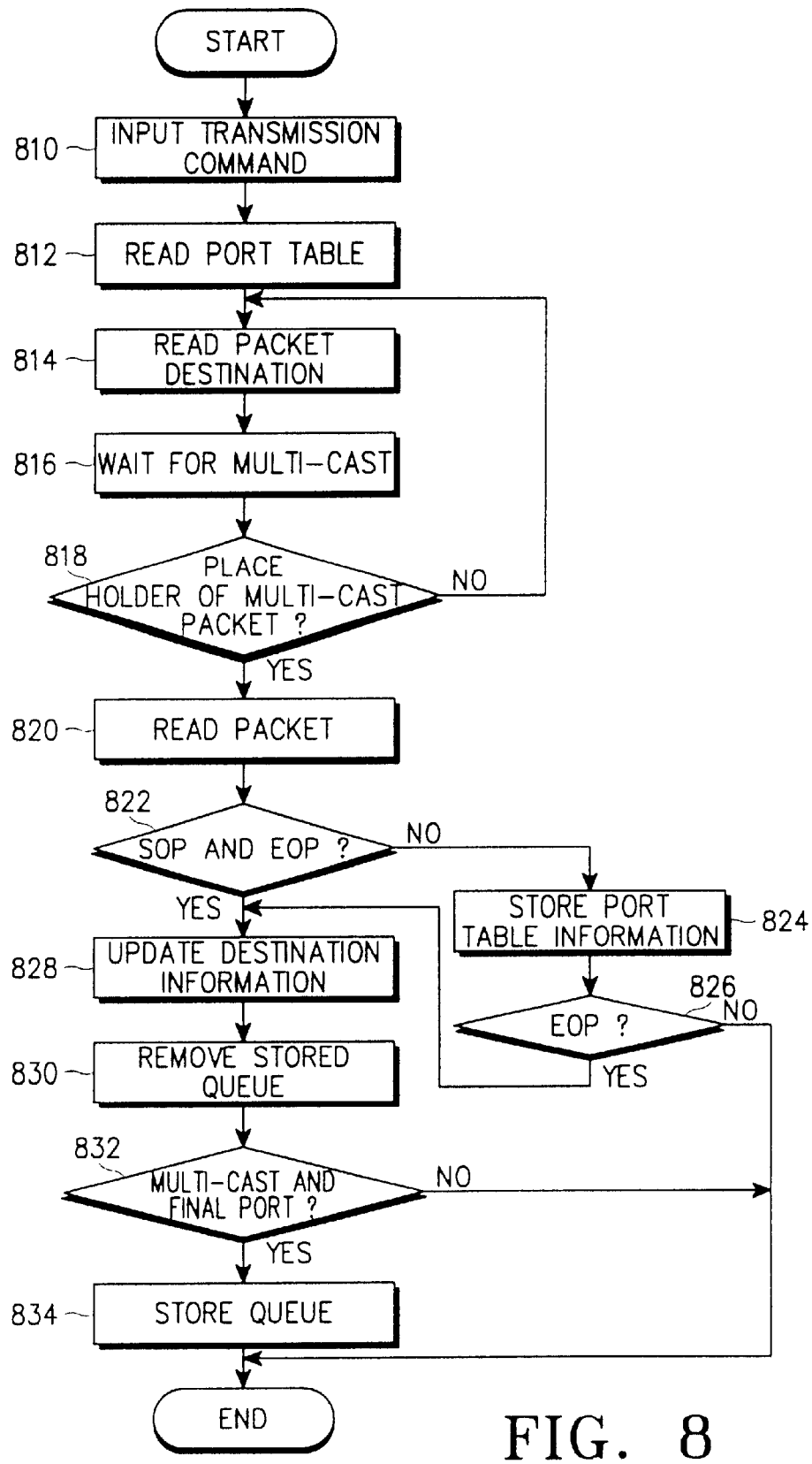
FIG. 8 is a flowchart illustrating the whole transmission control operation of the packet switching apparatus according to the embodiment of the present invention.

FIG. 8 is a flowchart illustrating the whole transmission control process performed by the packet switching apparatus according to an embodiment of the present invention. The respective processes illustrated therein correspond to the general data packet processes in the packet switching system.

Third Embodiment

Figure 9:
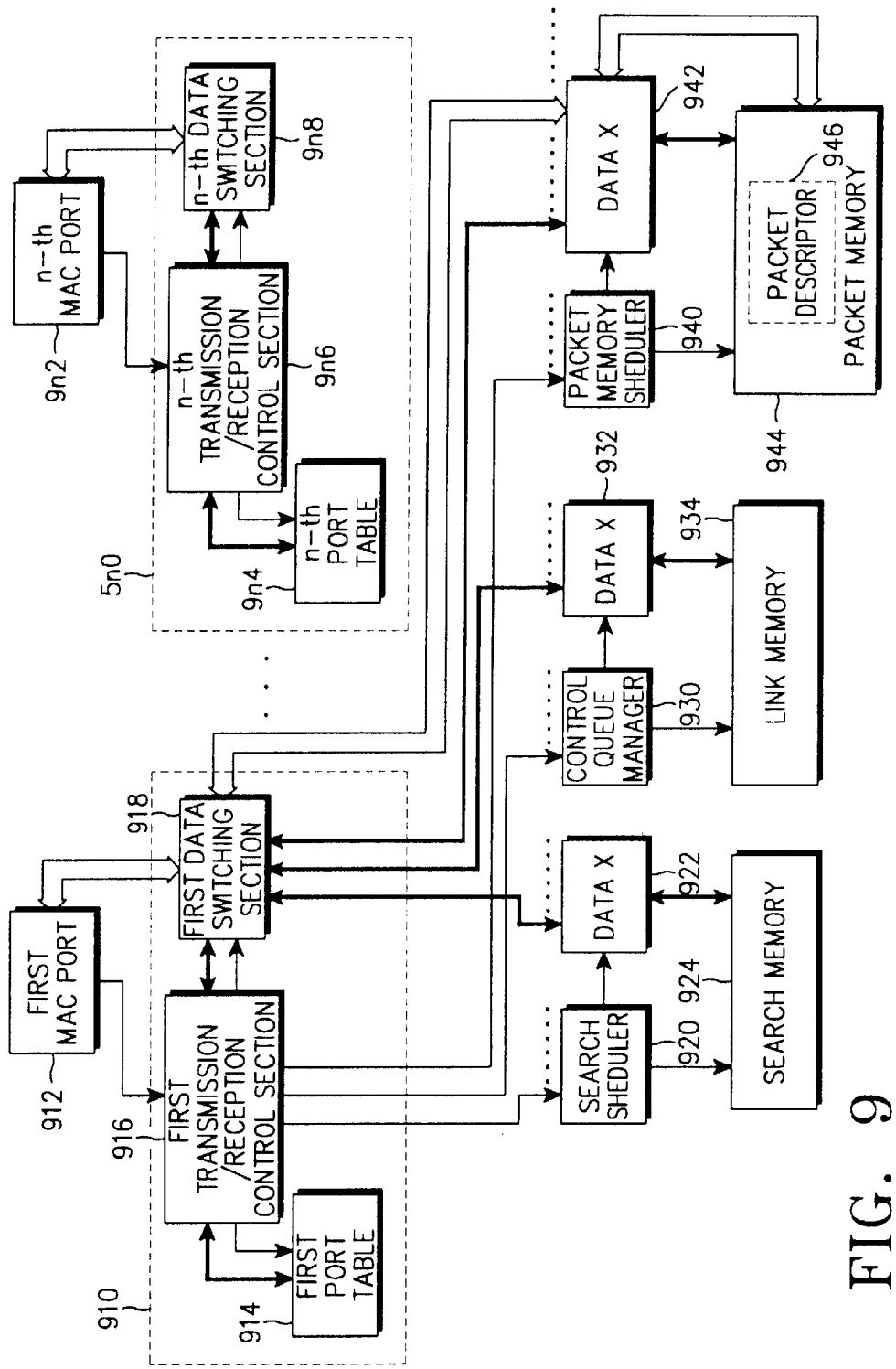
FIG. 9 is a block diagram of the packet switching apparatus in a data network according to a third embodiment of the present invention.

FIG. 9 illustrates the construction of the packet switching apparatus in a data network according to a third embodiment of the present invention. The construction of the apparatus of FIG. 9 is similar to that of FIG. 5, but according to the apparatus of FIG. 9, the packet connection information, which is the information resource provided in the packet memory 544 of FIG. 5, is separated. Specifically, a link memory 934 is separated from a packet memory 944 and stores therein the packet connection information. The packet connection information may be composed of the next descriptors and transmission queue pointers. The respective next descriptors correspond to the respective rooms of the packet memory 944 and can have address information of the next linked rooms. The transmission queue pointers may have header, tail information, and information on the number of current rooms related to the corresponding queues.

The control queue manager 930 enables the first port transmission/reception control section 916 to the n-Th port transmission/reception control section 9n6 to share itself. The control queue manager 930 consults and updates the packet connection information by accessing the link memory 934, stores the pointer information of the respective queues for the queueing operation with respect to the packet memory 944, and updates the pointer information according to the queueing operation. Also, the control queue manager 930 outputs the pointer information to the selected corresponding port transmission/reception control section, and this causes the port transmission/reception control section to perform the queueing operation.

Referring again to FIG. 9, the address table 534 of FIG. 5 is included in the search memory 924. According to the construction of FIG. 9, the respective port transmission/reception control sections obtain the address information by accessing the search scheduler 920.

Forth Embodiment

Figure 10:
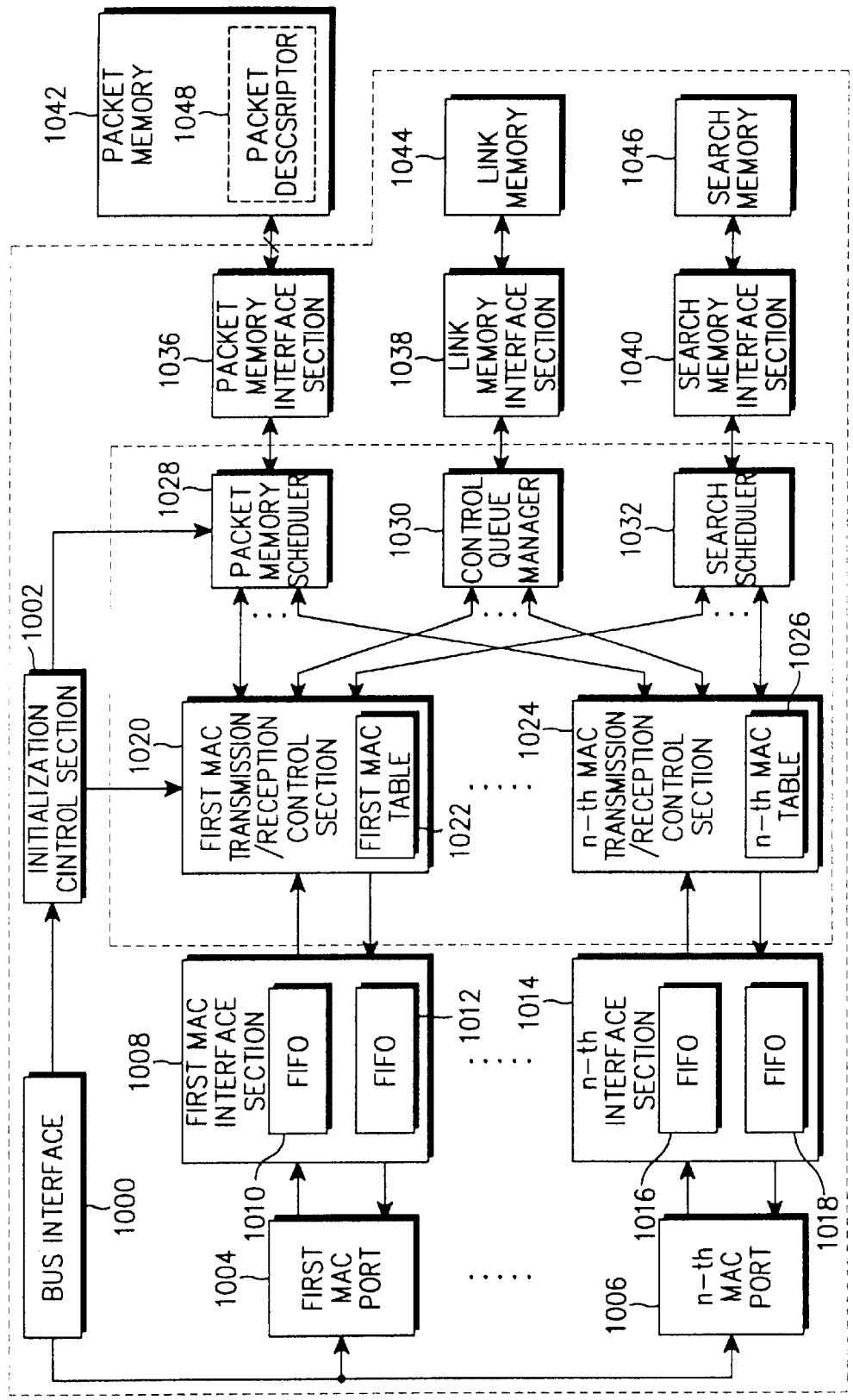
FIG. 10 is a block diagram of the packet switching apparatus in a data network according to a fourth embodiment of the present invention.

FIG. 10 illustrates the construction of the packet switching apparatus in a data network according to a fourth embodiment of the present invention. The construction of the apparatus of FIG. 10 is similar to that of FIG. 6, but according to the apparatus of FIG. 10, the packet connection information which is the information resource provided in the packet memory 642 of FIG. 6 is separated. Specifically, a link memory 1044 is separated from a packet memory 1042, and stores therein the packet connection information. The packet connection information may be composed of the next descriptors and transmission queue pointers. The respective next descriptors correspond to the respective rooms of the packet memory 1042 and can have address information of next linked rooms. The transmission queue pointers may have a header, tail information, and information on the number of current rooms related to the corresponding queues.

The control queue manager 1030 enables the first port transmission/reception control section 1020 to the n-th port transmission/reception control section 1024 to share itself. The control queue manager 1030 is connected to the respective port transmission/reception control sections. The control queue manager 1030 schedules the connection request signals from the respective port transmission/reception control sections, and performs the enqueueing and dequeueing operation with respect to the queues such as the receive (Rx) queue, transmission (Tx) queue, etc.

Also, the control queue manager 1030 consults and updates the packet connection information by accessing the link memory 1044, stores the pointer information of the respective queues for the queueing operation with respect to the packet memory 1044, and updates the pointer information according to the queueing operation.

Referring again to FIG. 10, the address table 644 of FIG. 6 is included in the search memory 1046. According to the construction of FIG. 10, the respective port transmission/reception control sections obtain the address information by accessing the search scheduler 1032.

Meanwhile, the performance of the packet switching apparatus can be estimated by various elements, and the most important one among the elements is a throughput. Here, the throughput means the quantity of data that can be processed per unit time. Due to the size of a variable packet such as an Ethernet packet, the processing capability of the packet of 64 bytes, which has the most inferior throughput, can commonly put the performance of the packet switching apparatus. Particularly, if the input speed is identical to the output speed when unicast packets of 64 bytes are inputted to all ports, then outputted from ports different from the input ports, the packet switch supports the wire-speed.

Table 3 below shows an example of the transmission/reception processing of the packet switching apparatus having the construction of FIG. 10 with respect to a single normal unicast packet.

TABLE 3

| State | Description | Required clock | Processing block |
|---|---|---|---|
| Reception Control Operation | | | |
| DeQ EB, EnQ Rx | Extract one room from on empty buffer to store the received packet therein | 14 | CQM |
| Init Desc | Store the descriptor which is information of the respective packet | 1clk{1 clk(scheduling + 3clk(hand-shaking between PCU and PMI) + 4clk(Data Xfer) + 3clk(precharge SGRAM)} | PMI |
| Xfer Packet | Store actual data in the packet memory | 23(1 + 3 + 16 + 3) | PMI |
| DeQ Rx, EnQ Tx | Store the reception-completed room in Tx queue | 17 | CQM |
| Transmission Control Operation | | | |
| Read Des | Read information of the packet to be transmitted | 12clk{1clk(scheduling) + 4clk(hand-shaking) + 4clk(Data Xfer) + 3clk (precharge SGRAM)} | PMI |
| Xfer Packet | Read the data to be transmitted Packet | 24(1 + 4 + 16 + 4) | PMI |

TABLE 3-continued

| State | Description | Required clock | Processing block |
|---|---|---|---|
| DeQ Tx, EnQ EB | Enqueue the transmission-completed room in the empty buffer to use it again as an empty room | 20 | CQM |

In Table 3, "CQM" is an abbreviation of a control queue manager, and "PMI" is an abbreviation of a packet memory interface. Also, "PCU" is an abbreviation of a port control unit and means a port transmission/reception control section.

In Table 3, it can be known that the time required for processing a single unicast packet by the packet memory interface is 70 clocks in all, and the time required by the control queue manager is 51 clocks in all. Accordingly, the bottleneck in the whole processing is PMI, and as a result, the time required for the transmission/reception of a packet of 64 bytes will be 70 clocks in total. Meanwhile, in case of an Ethernet packet of 64 bytes, a respective unicast packet includes an inter-frame gap of 12 bytes and a preamble of 8 bytes, and thus is composed of 672 bits (=84×8 bits).

Accordingly, if the number of MAC ports is 8 in the apparatus of FIG. 10, the throughput with respect to a packet of 672 bits at a frequency of 66 MHz can be expressed by:

(672 bits×66 Mclkpersec/70clk)×2(Rx and Tx are included)=1.267 Gbps. [Equation 4]

In Equation 4, in case that the number of MAC ports is 8, the packet switching apparatus of FIG. 10 should have a processing speed of 1.6 Gbps to support the wire-speed.

Fifth Embodiment

FIG. 11 illustrates the packet switching apparatus in a data network according to a fifth embodiment of the present invention. The construction of the apparatus of FIG. 11 is similar to that of FIG. 10, but according to the apparatus of FIG. 11, the packet descriptor 1048 which is the information resource provided in the packet memory 1042 of FIG. 10 is separated.

In other words, a memory for separately storing the packet descriptor is added. This added memory may be provided inside or outside the chip, and this causes the load of a packet memory 1144 to be reduced, so that the transmission/reception control time can be reduced. The information of the respective packet stored in a packet descriptor memory 1146 can be mapped on the respective packet actually stored in the packet memory 1144 in a one-to-one manner. Thus, if one address is known in the memory, the other address can always be known.

Referring to FIG. 11, the packet descriptor memory 1146 is separated from the packet memory 1144, and stores therein the information of the respective packets. A packet descriptor memory scheduler 1130 is connected to the respective port transmission/reception control sections. The packet descriptor memory scheduler 1130 schedules connection request signals from the respective port transmission/reception control sections and accesses the information of the respective packets stored in the packet descriptor memory 1146.

The time required for the transmission/reception processing of the packet switching apparatus of FIG. 11 with respect to the unicast packet is as follows: during the packet transmission (Tx) and reception (Rx), it requires 47 clocks for a packet descriptor memory interface 1138 to purely transfer the packet, and it requires 23 clocks for the packet descriptor memory interface 1138 to initialize and access the packet descriptor memory 1146. Also, as described above, a control queue manager 1132 requires 51 clocks. The bottleneck in the construction of FIG. 11 is the control queue manager 1132, and the throughput at this time can be expressed by:

$$(672 \text{ bits} \times 66 \text{ Mclkpersec}/51\text{clk}) \times 2(\text{Rx and Tx are included}) = 1.74 \text{ Gbps}. \quad [\text{Equation 5}]$$

In Equation 5, in case of 8 MAC ports, the packet switching apparatus of FIG. 11 has a processing speed of 1.6 Gbps or more with respect to the unipacket and thus can support the wire-speed.

As described above, according to the packet switching apparatus and method of the present invention, the information resources required for the packet switching such as the packet descriptor, port table, link memory, address table, etc., are classified into groups, and the information resources are accessed in parallel by scheduling of a plurality of transmission/reception control sections, so that the control overhead can be reduced. Accordingly, the present invention can perform a high-speed packet switching with the structural modification of the conventional packet switching apparatus.

While this invention has been described in connection with what is presently considered to be the most practical and preferred embodiments, it is to be understood that other modifications thereof may be made without departing from the scope of the invention. Thus, the invention should not be limited to the disclosed embodiment but should be defined by the scope of the appended claims and their equivalents.

What is claimed is:

1. A packet switching apparatus in a data network comprising:
   a plurality of ports for controlling of an input/output of packet transmission/reception commands and data packets;
   a plurality of transmission/reception control sections for accessing information resources classified into groups in response to the packet transmission/reception commands, and storing the corresponding data packets in a packet memory or transmitting the corresponding data packets stored in the packet memory to the corresponding ports;
   a plurality of the information resources for storing in groups information required for packet switching and for providing the information stored therein to the transmission/reception control sections; and,
   a plurality of information resource schedulers coupled to the respective information resources for scheduling accesses of the transmission/reception control sections.

2. The packet switching apparatus according to claim 1, wherein the plurality of transmission/reception control sections are provided for the respective ports.

3. The packet switching apparatus according to claim 2, wherein the plurality of information resources comprise a packet descriptor, a link memory, a search memory, and a port table.

4. The packet switching apparatus according to claim 3, wherein the port table is provided for the respective port.

5. The packet switching apparatus according to claim 3, wherein the plurality of resources include a search scheduler connected to the plurality of transmission/reception control sections and the search memory so that the search memory is shared by the plurality of transmission/reception control sections.

6. The packet switching apparatus according to claim 3, wherein the plurality of resources include an address table scheduler and an address table, the address table scheduler being connected to the plurality of transmission/reception control sections and the address table so that the address table is shared by the plurality of transmission/reception control sections.

7. The packet switching apparatus according to claim 3, wherein the plurality of resources include a control queue manager connected to the plurality of transmission/reception control sections so that each of the respective transmission/reception control sections can be shared with each other, and wherein the control queue manager provides a storing of pointer information of respective queues with respect to a packet memory including the packet descriptor, the packet memory being shared by the plurality of transmission/reception control sections.

8. The packet switching apparatus according to claim 4, wherein the plurality of ports comprise MAC ports having a FIFO system for the input/output of transmission/reception commands and data packets.

9. The packet switching apparatus according to claim 3, wherein a packet memory comprises the packet descriptor, a packet memory scheduler is connected to the plurality of transmission/reception control sections, wherein a packet memory interface is connected to the packet memory scheduler and the packet memory so as to provide an interface between the packet memory scheduler and the packet memory.

10. The packet switching apparatus according to claim 5, further comprising a search memory interface section which provides an interface between the search scheduler and the search memory.

11. A packet switching method in a data network, comprising the following steps:
   (1) outputting access signals by a plurality of transmission/reception control sections corresponding to schedulers of information resources classified into groups to access the respective information resources;
   (2) performing a scheduling by a plurality of schedulers of the respective information resources with respect to the access signals, so that the plurality of transmission/reception control sections can access one of the information resources at a time; and,
   (3) storing the received data packets or transmitting the stored data packets of the plurality of transmission/reception control sections with reference to the corresponding information resources if access paths are connected.

12. The packet switching method as claimed in claim 11, wherein the plurality of transmission/reception control sections are provided for the respective ports.

13. The packet switching method as claimed in claim 12, wherein the plurality of information resources are a packet descriptor, a link memory, a search memory, and a port table.

14. The packet switching method as claimed in claim 13, wherein the port table is provided for the respective port.

15. The packet switching method according to claim 11, wherein step (3) includes:
   (i) providing a packet memory for storing sub-packets; and, (ii) providing a packet descriptor for storing information about the sub-packets stored in sub-step (i).

16. The packing switching method according to claim 15, includes:

(iii) performing a search operation by one of the plurality of transmission/reception control sections by accessing the search memory if a received sub-packet corresponds to a start of packet (SOP) command received by the transmission/reception control section; and, (iv) partially performing the packet transmission command if an input packet transmission command does not correspond to the search operation while the search operation is being performed.

17. The packet switching method according to claim 16, wherein when the storing of packets is completed with respect to a whole frame, the transmission/reception control section dequeues a receive queue and enqueues a transmission queue with respect to a destination MAC port.

18. The packet switching method according to claim 11, wherein step (2) includes:

(i) enabling the plurality of transmission/reception control section to share themselves by providing a control queue manager for scheduling request signals from the respective transmission/reception control sections.

19. The packet switching method according to claim 18, further comprising:

(ii) dequeueing a receive queue and enqueueing a transmission queue with respect to a destination MAC port.

20. The packet switching method according to claim 18, wherein the control queue manager consults and updates the link memory, stores the pointer information of respective queues for the queuing operation with respect to the packet memory and updates the pointer information according to the queuing operation.

* * * * *